Patented Apr. 8, 1924.

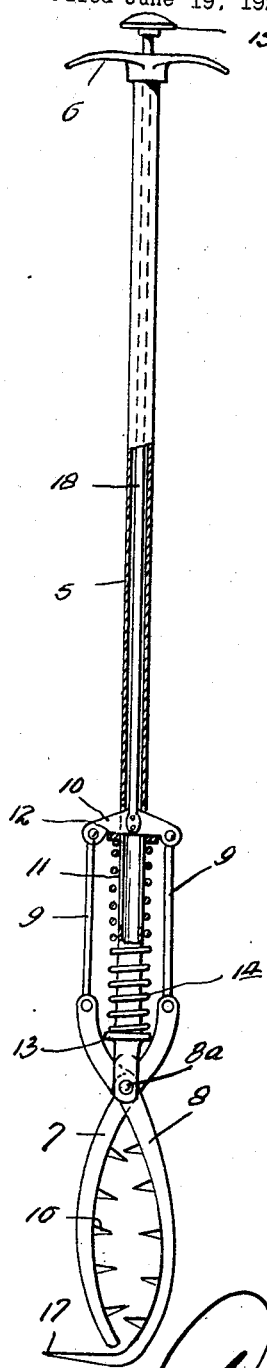

1,489,581

UNITED STATES PATENT OFFICE.

JEREMIAH F. LYNCH, OF GROTON, NEW YORK.

FISH GAFF.

Application filed June 19, 1923. Serial No. 646,331.

*To all whom it may concern:*

Be it known that I, JEREMIAH F. LYNCH, a citizen of the United States, residing at Groton, in the county of Tompkins and State of New York, have invented certain new and useful Improvements in Fish Gaffs, of which the following is a specification.

My invention relates to improvements in fish gaffs, and has for its primary object, the provision of such a fishing implement wherein the jaws thereof are normally maintained in a closed position by spring means, these jaws adapted to be opened by the hand of the operator, whereby the same may be engaged around the jaw of a fish, after which the jaw expanding mechanism is released.

A further object of the invention is to provide such an implement wherein any liability of the jaws working open when a fish is engaged therebetween by the wiggling of the fish is overcome.

Yet another object is to provide a fish gaff that is extremely simple of construction, easy of operation, and one that embraces at the same time, the desired features of efficiency and durability.

The nature and advantages of the invention will be better understood when the following detailed description is read in connection with the accompanying drawing, the invention residing in the combination, construction, and arrangement of parts as claimed.

In the drawing forming part of this application, like numerals of reference indicate corresponding parts in the view:

The figure is a side elevation partly in cross section of my automatic fish gaff.

My implement comprises a relatively elongated tubular housing 5 open at its opposite ends and formed at its upper end with a cross finger piece 6.

The lower end of this tubular housing 5 is split and pivotally secured therebetween is a pair of gaff jaws designated 7 and 8, respectively. These jaws are preferably of the shape as shown, and are crossed at their point of pivotal connection 8ª and loosely connected to the upper end of said gaff jaws are connecting links 9 in the form of rod sections. Loosely, pivotally connected to the upper ends of said links 9 and at its opposite ends thereof is a cross head 10 that has free sliding movement within a cross slot 11 formed in said tubular housing.

Beneath this cross head 10, and having free sliding movement upon the tubular housing 5 is a washer plate 12 and between this washer 12 and a flange 13 formed adjacent the lower end of said housing 5 is an expansible spring 14, for normally forcing the washer and cross plate to the position shown in the figure for thereby closing the jaws 7 and 8. Slidable within the housing 5 and rigidly connected at its lower end to the cross head 10 is a control rod 18, the upper end thereof extending through the upper end of said housing and equipped with a thumb piece 15. The gaff jaws 7 and 8 are provided with inwardly extending fish engaging prongs 16 for obvious purposes, the free end of the jaw 8 being bent inwardly to provide a hook 17 also for obvious purposes.

In actual practice, the fingers of the operator grasp the finger pieces 6 at the front end of the tubular housing, and the jaws 7 and 8 are opened by pressing upon the thumb piece 15 of the rod 18. When a fish has been caught, these jaws 7 and 8 are positioned upon opposite sides of his body, and the rod released, whereby the spring 14 will consequently afford a means for automatically closing the jaws. A wiggling of the fish will tend to tilt the cross head 10, for thereby binding the washer 12 upon the rod and thereby prevent a further opening of said jaws.

In view of the above description when considered in conjunction with the accompanying drawing, numerous advantages of a fish gaff of this character will be appreciated by those skilled in the art, and even though I have herein shown and described the most practical embodiment of the invention with which I am at present familiar, it is nevertheless to be understood that minor changes may be made therein, without departing from the spirit and scope of the invention as claimed.

Having thus described my invention, and I claim as new, and desire to secure by Letters-Patent, is:

A fish gaff, including an elongated tubular housing, a pair of cross jaws pivotally mounted adjacent their upper ends to the lower end of said housing, said housing being slotted longitudinally thereof adjacent the lower end, a cross head slidable in the slot of the housing and having the ends extending outwardly therefrom, link connections between the ends of the cross head and the respective cross jaws, a washer plate slidable on the housing beneath the cross head and contacting therewith, resilient means having an abutment at the lower end of the housing engaging said washer plate for normally forcing said plate and cross head upwardly to close said cross jaws, and manually operated means for opening said jaws, said washer plate being adapted for binding contact with the housing upon a relative outward movement between the jaws.

In testimony whereof I affix my signature.

JEREMIAH F. LYNCH.